United States Patent
Kmec et al.

(10) Patent No.: US 6,207,079 B1
(45) Date of Patent: Mar. 27, 2001

(54) SCALE AND/OR CORROSION INHIBITING COMPOSITION

(75) Inventors: Pavol Kmec, Hamburg; Dwight E. Emerich, Lincoln Park, both of NJ (US)

(73) Assignee: Ashland Inc., Dublin, OH (US)

( * ) Notice: Subject to any disclaimer, the term of this patent is extended or adjusted under 35 U.S.C. 154(b) by 0 days.

(21) Appl. No.: 09/238,850

(22) Filed: Jan. 28, 1999

(51) Int. Cl.$^7$ ............................... C09K 3/00; C23F 11/00; C02F 1/68
(52) U.S. Cl. ............... 252/389.2; 252/390; 252/396; 252/387; 210/697; 210/700; 210/749
(58) Field of Search .................... 252/180, 387, 252/389.2, 390, 396; 210/697, 700, 749

(56) References Cited

U.S. PATENT DOCUMENTS

| | | | |
|---|---|---|---|
| 4,534,881 | * | 8/1985 | Sikes et al. ........................... 252/180 |
| 4,678,840 | * | 7/1987 | Fong et al. ........................... 525/340 |
| 5,049,304 | * | 9/1991 | Greaves ................................. 252/180 |
| 5,093,005 | * | 3/1992 | Greaves ................................. 210/700 |
| 5,314,660 | * | 5/1994 | Clark et al. ............................. 422/15 |
| 5,386,038 | * | 1/1995 | Davis et al. ........................... 549/262 |
| 5,523,023 | * | 6/1996 | Kleinstuck et al. ................. 510/219 |
| 5,531,934 | * | 7/1996 | Freeman et al. ..................... 252/390 |
| 5,606,105 | * | 2/1997 | Davis et al. ............................. 562/8 |
| 5,658,464 | * | 8/1997 | Hann et al. ........................... 210/697 |
| 5,726,280 | * | 3/1998 | Uhr et al. .............................. 528/328 |

* cited by examiner

*Primary Examiner*—Jill Warden
*Assistant Examiner*—Latoya J. Cross
(74) *Attorney, Agent, or Firm*—David L. Hedden

(57) ABSTRACT

This invention relates to a scale inhibiting composition for aqueous systems comprising (a) polyaspartic acid, and (b) a water soluble phosphonated oligomer. The compositions are effective scale and/or corrosion inhibitors, but are also advantageous from an environmental standpoint because they are non-toxic, contain no heavy metals, and have little or no phosphorus. They also have sufficient calcium/hardness tolerance, are chlorine/bromine stable, and are effective corrosion inhibitors.

10 Claims, No Drawings

SCALE AND/OR CORROSION INHIBITING COMPOSITION

FIELD OF THE INVENTION

This invention relates to a scale and/or corrosion inhibiting compositions for aqueous systems comprising (a) polyaspartic acid or salts thereof, and (b) a water soluble phosphonated oligomer. The compositions are effective scale inhibitors, but are also advantageous from an environmental standpoint because they are non-toxic, contain no heavy metals, and have little or no phosphorus. They also have significant calcium/hardness tolerance, are chlorine/bromine stable, and are effective corrosion inhibitors.

BACKGROUND OF THE INVENTION

Water used in industrial cooling or mining systems comes from rivers, lakes, ponds or from underground reservoirs. Such water contains dissolved inorganic salts. When this water circulates through the heat exchangers and cooling towers in a cooling system, a portion of the water is lost due to the evaporation. This increases the concentration of inorganic salts in the system. If the solubility of these salts in water is exceeded, precipitation will take place.

As the salts precipitate on the internal surface of a cooling system, they form scale or deposits. The scale inhibits effective heat transfer, restricts the flow of the water, and promotes the development of underdeposit corrosion. Consequently, it is necessary to remove the scale by cleaning. Such cleaning is expensive because equipment must be shutdown, labor costs are incurred, and production is delayed. In view of these problems, preventing scale formation is preferred to scale removal.

Scale formation can be inhibited by adding a sequestering or chelating compound to the water treatment system. The amount of a chelating/sequestering compound required is a stoichiometric amount based upon the amount of calcium and magnesium cations in the aqueous system cleaned. This method of the scale inhibition is expensive and not customarily used.

More than 50 years ago it was discovered that certain compounds performed as highly efficient scale inhibitors. Such compounds are used in significantly lower than stoichiometric amounts and are known as "threshold inhibitors". Examples of threshold inhibitors are phosphonates and water soluble acrylic/maleic/sulfonic polymers or copolymers. Corrosion inhibitors, such as phosphonates, inorganic phosphates, azoles, zinc, and molybdate, are often used with scale inhibitors.

In addition to effective performance, water treatment chemicals must be environmentally acceptable. Environmental regulations prohibit the use of such corrosion inhibitors as chromates and restrictions are now prevalent for the use of all heavy metals. The trend is also toward water treatment chemicals that are non-toxic, have little or no phosphorus, have high calcium/hardness tolerance, are chlorine/bromine stable, and at the same time have high scale and corrosion efficacy. Because of these requirements, the cost of water has increased, causing higher reuse/higher cooling cycles which results in cooling waters with high hardness and alkalinity contents.

U.S. Pat. No. 5,523,023 relates to compositions comprising polyaspartic acid and phosphonobutane tricarboxylic acid which are used for alkaline cleaners. U.S. Pat. No. 5,386,038 discloses a water soluble mixture of phosphonated oligomers having the general formula:

wherein at least one R group in each unit is a COOM, CH$_2$OH, phosphono sulphono, sulphato, or phosphono group and the other R group which may be the same as, or different from, the first R group, is hydrogen or a COOM, hydroxyl, phosphono sulphono, sulphato, C$_{1-7}$ alkyl, C$_{1-7}$ alkenyl group or a carboxylate, phosphono, sulphono, sulphato, and/or hydroxyl C$_{1-7}$ alkyl, C$_{1-7}$ alkenyl group, and each M is a cation such that the phosphonated oligomer is water soluble and n is 1 to 6, preferably >1 and <6. These compositions inhibit scale formation and/or the corrosion of metal exposed to aqueous systems.

SUMMARY OF THE INVENTION

This invention relates to scale inhibitor compositions for aqueous systems such as cooling waters, mining waters and geothermal waters having high levels of hardness and alkalinity. The compositions comprise:

(a) a water soluble polyaspartic acid or salt thereof; and (b) a water soluble phosphonated oligomer having the general formula (I):

wherein at least one R group in each unit is a COOM, CH$_2$OH, sulphono, or phosphono group and the other R group which may be the same as, or different from, the first R group, is hydrogen or a COOM, hydroxyl, phosphono, sulphono, sulphato, C$_{1-7}$ alkyl, C$_{1-7}$ alkenyl group or a carboxylate, phosphono, sulphono, sulphato, and/or hydroxyl substituted C$_{1-7}$ alkyl or C$_{1-7}$ alkenyl group, and each M is a cation such that the phosphonated oligomer is water soluble and n is 1 to 6, preferably >1 and <6.

The scale inhibiting compositions are synergistic because they inhibit scale to a greater extent than was expected in view of the scale inhibition activity of the individual components. The compositions are environmentally desirable because they are non-toxic, contain no heavy metals, and have low or no phosphorus. They have significant calcium/hardness tolerance, are chlorine/bromine stable, and also effectively inhibit corrosion.

BEST MODE AND OTHER MODES

Component (a) of the scale inhibitor composition is a water soluble polyaspartic acid. For purposes of this invention, the term "polyaspartic acid" shall be construed to include salts and derivatives of polyaspartic acid. Polyaspartic acid, salts thereof, and derivatives of polyaspartic acid are well known and are described in U.S. Pat. No. 5,523,023 which is hereby incorporated by reference. Preferably used is polyaspartic acid having a molecular weight, according to gel-permeation chromatographic analysis, of from 500 to 10,000, preferably 1,000 to 5,000, most preferably 2,000 to 4,000. The polyaspartic acid is preferably used as a salt, in particular as a sodium salt or potassium salt. Whether polyaspartic acid is used in the form of an acid or a salt depends upon the pH of the aqueous system treated. Preferably the salts of polyaspartic acid are sodium salts. Derivatives of polyaspartic acid, for example anhydrides of polyaspartic acid, which can convert into polyaspartic acid as a result of hydrolysis under use conditions, also can be used.

Component (b) of the scale inhibitor composition is a water soluble phosphonocarboxylic oligomer salt, preferably a sodium salt, typically found as mixture of oligomers. These oligomers are described in U.S. Pat. No. 5,386,038 which hereby is incorporated by reference. The general structural formula (I) for these water soluble phosphonocarboxylic oligomer salts is set forth previously under the Summary of the Invention. Preferably used as the water soluble phosphonocarboxylic oligomer salts are salts having the following specific version of the above general structural formula:

H[CH(CO$_2$Na)—CH(CO$_2$Na)]$_n$PO$_3$Na$_2$ where "n"<5. Specific examples of water soluble phosphonocarboxylic oligomer salts include an aqueous mixture of phosphonocarboxylic acid oligomeric salts known as BRICORR 288, manufactured by Albright&Wilson Inc. The weight ratio of phosphonated oligomer to polyaspartic acid to is from 8:1 to 1:12, preferably 4:1 to 1:9, more preferably from 1:4 to 1:9.

For some applications it is preferable to add a water soluble copolymer to the scale inhibiting composition, for instance phosphinocarboxylic polymer, maleic acid or maleic anhydride polymer, acrylic polymer, methacrylic polymer and their copolymers with sulfonic and/or phosphino functionalities, preferably acrylic/sulfonic copolymers or acrylic/maleic copolymers.

Other optional components include phosphonobutane tricarboxylic acid, tolyltriazole, orthophosphate, polyphosphates, hydroxyethylidene diphosphonic acid, amino tri(methylene phosphonic acid).

The scale inhibiting compositions inhibit the formation of calcium carbonate, calcium phosphate, calcium sulfate, and other scale forming substances. They are particularly useful in the pH range of 8.0 to 9.0 and at temperatures of 40° C. to 65° C. The scale inhibiting compositions are used at the minimum dosage of 0.1 ppm, but preferably in a dosage of 5.0 to 500.0 ppm, most preferably 10.0 to 200.0 ppm.

ABBREVIATIONS

The following are the abbreviations used in the examples:
MPY
corrosion rate in "Millimeters Per Year.
PAA
polyaspartic acid known as VPOC 2401, manufactured by Bayer Co.
PCM
aqueous mixture of phosphonocarboxylic acid oligomeric salts known as BRICORR 288, manufactured by Albright&Wilson Inc.

EXAMPLES

The examples which follow will illustrate specific embodiments of the invention. They are not considered to limit the application of this invention. It is contemplated that other embodiments will be useful.

Example 1

CACO$_3$ Scale Threshold Inhibition

Scale inhibition for several scale inhibiting blends containing PCC and PAA were evaluated with the standard calcium carbonate shaker test. Several controls were also evaluated.

The procedure involved adding the test scale inhibitor composition (amount specified in Tables I and II) to a solution comprising 90.0 ml of DI water, 5.0 ml of the calcium stock solution (14.7 g of CaCl$_2$.2H$_2$O/liter), and 5.0 ml of the alkalinity stock solution ((1.59 g of Na$_2$CO$_3$+14.8 g of NaHCO$_3$)/liter) to a 125 ml shaker flask. The resulting initial test water parameters were: calcium as CaCO$_3$=500 ppm, total alkalinity as CaCO$_3$=500 ppm and pH=8.5). The flasks were then covered and put on a shaker at 50° C. for 16–18 hours. After the shaker time ended, the entire test solution volume was filtrated through Whatman #5 filter paper. The filtrate was then titrated with 0.01 M EDTA solution to determine the amount of calcium remaining in the test solution. The results are set forth in the Tables I and II, where each % inhibition is an average of 5 repetitions and where the % calcium inhibition was calculated as follows:

% Threshold inhibition (% TI)=[(ppm A−ppm B)÷(500−ppm B)]×100 where:

500=initial calcium concentration of 500 ppm as CaCO$_3$ ppm;

ppm A=calcium concentration as ppm of CaCO$_3$ in the filtrate, after the testing; and ppm B=calcium concentration as ppm of CaCO$_3$ in the blank, after the testing.

TABLE I

% TI FOR PCM/PAA BLENDS

| Example | PCM (ppm solids) | PAA (ppm solids) | PCM:PAA (Ratio) | % TI |
|---|---|---|---|---|
| Control A | 0.0 | 25.0 | 0:25 | 12.0 |
| 1 | 2.5 | 22.5 | 1:9 | 57.4 |
| 2 | 3.1 | 21.9 | 1:7 | 70.6 |
| 3 | 5.0 | 20.0 | 1:4 | 60.0 |
| 4 | 12.5 | 12.5 | 1:1 | 56.8 |
| 5 | 20.0 | 5.0 | 4:1 | 56.4 |
| Control B | 25.0 | 0.0 | 25:0 | 54.1 |

The results in Table I show the % TI for PCM/PAA blends. The data in Table I indicate that PAA alone (Control A) is not effective as scale inhibitor, but that PCM alone (Control B) is much more effective than PAA alone. However, blends of PAA and PCM (Examples 1–5) are more effective than either PAA or PCM alone.

Table II shows the selected results from the Table I plus additional test results. The test results are arranged to determine whether the PCM/PAA blends exhibit synergism.

TABLE II

SYNERGISTIC EFFECT OF BLENDS

| | PCM Alone | | PAA Alone | | PCM + PAA | | PCM/PAA Blends | | |
|---|---|---|---|---|---|---|---|---|---|
| Example | ppm | % TI | ppm | % TI | ppm + ppm | Ratio | Predicted % TI | Achieved % TI | Increase % TI |
| 6 | 5.0 | 39.0 | 20.0 | 12.9 | 5 + 20 | 1:4 | 51.9 | 60.0 | +8.1 |
| 7 | 3.1 | 21.0 | 21.9 | 11.1 | 3.1 + 21.9 | 1:7 | 32.1 | 70.6 | +38.5 |
| 8 | 2.5 | 8.5 | 22.5 | 11.9 | 2.5 + 22.5 | 1:9 | 20.4 | 57.4 | +37.0 |

The data in Table II show that the blends of PCM and PAA achieved significantly higher % TI values (achieved) than those which have been theoretically predicted. The difference between the achieved values and predicted values ranged from 8.1% to 38.5%.

Example 2

Spinner Bath Corrosion Test Method

The compositions were also tested on mild steel (C1010) test coupons as corrosion inhibitors. The "Spinner Bath Corrosion Test" was used to evaluate compositions. The procedure involved adding the test corrosion inhibitor composition (amount specified in Table III) to a solution in a test jar, comprising 7.8 liters of DI water, 100.0 ml of the hardness stock solution (70.6 g of $CaCl_2 \cdot 2H_2O$ plus 42.0 g of $MgCl_2 \cdot 6H_2O$ per liter), and 100.0 ml of the alkalinity stock solution (8.5 g $Na_2CO_3$ plus 20.2 g of $NaHCO_3$ plus 35.5 g of $Na_2SO_4$ per liter). The pH of the water was adjusted to 8.5. The mild steel coupons were suspended into the water in the test jar on the spindle which in turn was attached to the drivetrain. The heat was turned on and the temperature of the water was maintained at 50° C. The drivetrain was turned on at its standard speed. After 4 fall days the system was turned off, coupons removed, cleaned, weighted and corrosion rate as MPY was calculated. The results are set forth in the Table III as an average of 2 repetitions. The results of this corrosion test are shown in Table III which follows.

TABLE III

RESULTS OF SPINNER BATH CORROSION TEST

| Example | PCM (ppm solids) | PAA (ppm solids) | MPV |
|---|---|---|---|
| Control C | 0.0 | 25.0 | NA[1] |
| 9 | 5.0 | 20.0 | 10.8 |
| 10 | 10.0 | 15.0 | 6.1 |
| 11 | 15.0 | 10.0 | 6.5 |
| 12 | 20.0 | 5.0 | 9.8 |
| Control D | 25.0 | 0.0 | 20.1 |

[1]The corrosion inhibition rate for the PAA alone is not shown in Table II because a heavy scale was deposited on coupons and therefore comparison with the rest of testing(coupons free of scale) would not be valid.

PAA is known to be very weak and insufficient corrosion inhibitor when used alone. The results of this test confirm this. The results of this test also show PCM is a weak and insufficient corrosion inhibitor. However, blends of PCM and PAA are shown to have much lower corrosion rates, indicating corrosion inhibition synergy between PCM and PAA.

We claim:

1. A scale and/or corrosion inhibiting composition comprising:
   (a) polyaspartic acid; and
   (b) a water soluble phosphonate oligomer salt having the general formula:

$H[CHRCHR]_n-PO_3M_2$ wherein
   (1) at least one R group in each unit is selected from the group consisting of a COOM, $CH_2OH$, sulphono, and a phosphono group;
   (2) the other R group which may be the same as, or different from, the first R group, is selected from the group consisting of hydrogen, COOM; hydroxyl; phosphono; sulphono; sulphato; $C_{1-7}$ alkyl; $C_{1-7}$ alkenyl; a carboxylate, phosphono, sulphono, sulphato, and/or hydroxyl substituted $C_{1-7}$ alkyl group; and a carboxylate, phosphono, sulphono, sulphato, and/or hydroxyl substituted $C_{1-7}$ alkenyl group;
   (3) each M is a cation such that the phosphonated oligomer is water soluble;
   (4) n is a number from 1 to 6; and
   (5) and the weight ratio of phosphonated oligomer to polyaspartic acid to is from 1:4 to 1:9.

2. The composition of claim 1 wherein the water soluble phosphonated oligomer has the formula:

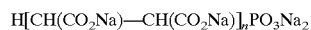

$H[CH(CO_2Na)-CH(CO_2Na)]_nPO_3Na_2$ where "n" is 1 to 5.

3. The composition of claim 2 which comprises at least one additional component selected from the group consisting of acrylic/sulfonic copolymers, acrylic/maleic copolymers, and mixtures thereof.

4. The composition of claim 3 which comprises at least one additional component selected from the group consisting of tolyltriazole, benzotriazole, orthophosphate, and polyphosphates.

5. A method for inhibiting the formation of scale in an aqueous system comprising:
   introducing the composition of claims 1, 2, 3, 4, 7, 8, or 9 into said aqueous system in an amount effective to inhibit the formation of scale wherein said composition is used in concentration from 10 ppm to 200 ppm based on the total of components (a) and (b).

6. The method of claim 5 wherein the scale inhibited is calcium carbonate.

7. The composition of claim 1 wherein the polyaspartic acid is selected from the group consisting of polyaspartic acid, salts thereof, derivatives thereof, and mixtures thereof.

8. The composition of claim 3 wherein the average molecular weight of the polyaspartic acid is from 500 to 10,000 as determined by gel-permeation chromatography.

9. The composition of claim 8 wherein the average molecular weight of the polyaspartic acid is from 2,000 to 4,000 as determined by gel-permeation chromatography.

10. A method for inhibiting the formation of corrosion in an aqueous system comprising:
    introducing the composition of claims 1, 2, 3, 4, 7, 8, or 9 into said aqueous system in a corrosion inhibiting amount wherein said composition is used in concentrations from 10 ppm to 200 ppm based on the total of components (a) and (b).

* * * * *